(12) United States Patent
Iwasaki

(10) Patent No.: US 6,238,066 B1
(45) Date of Patent: May 29, 2001

(54) TWO-DIMENSIONAL AREA TILTED ILLUMINATION SYSTEM HAVING CURVED REFLECTING MIRROR

(75) Inventor: Satoshi Iwasaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/280,213

(22) Filed: Mar. 29, 1999

(30) Foreign Application Priority Data

Apr. 9, 1998 (JP) .................................................. 10-097797

(51) Int. Cl.$^7$ ........................................................ F21V 7/00
(52) U.S. Cl. .......................... 362/347; 362/297; 362/346; 362/350
(58) Field of Search .................................. 362/347, 297, 362/346, 341, 350

(56) References Cited

U.S. PATENT DOCUMENTS

| | | |
|---|---|---|
| 4,568,179 * | 2/1986 | Durbin et al. ........................... 355/67 |
| 4,747,033 * | 5/1988 | Yasuda ................................... 362/296 |
| 4,891,739 * | 1/1990 | Yasuda ................................... 362/296 |
| 5,697,699 * | 12/1997 | Seo et al. ............................... 362/252 |
| 5,791,771 * | 8/1998 | Bjorner et al. ........................ 362/297 |

* cited by examiner

*Primary Examiner*—Alan Cariaso
*Assistant Examiner*—Ronald E. DelGizzi
(74) *Attorney, Agent, or Firm*—Sidley & Austin

(57) ABSTRACT

A two-dimensional area tilted illumination system has a long light source for emitting a light flux and a reflecting mirror having a generating line generally parallel to a longitudinal axis of the light source. A surface of the reflecting mirror has a first area for illuminating an illumination area after the light flux is first reflected and converged. The first area is shaped such that an intersection point of the light rays, reflected at two ends of the first area, is a position which results in the light rays impinging a center of the illumination area.

10 Claims, 10 Drawing Sheets

TWO-DIMENSIONAL AREA TILTED ILLUMINATION SYSTEM HAVING CURVED REFLECTING MIRROR

CROSS-REFERENCE TO RELATED APPLICATIONS

This application is based on Japanese Application No. 10-97797, the content of which is hereby incorporated by reference.

FIELD OF THE INVENTION

The present invention relates to an illumination system for illuminating a two-dimensional area. In one aspect, the present invention relates to an illumination system for a reading device, such as a scanner, for reading the image of an open and upwardly facing document or a thick document, such as a book.

BACKGROUND OF THE INVENTION

Conventional illumination devices used in reading devices for reading open-faced document images, such as those in books, are known to be arranged above and behind a document so that the device does not cast a shadow on the book binding area so that the light of a document image is not blocked from the image sensing means, and such that the direct reflection light of an illuminated document does not enter the image sensing means. Japanese Laid-Open Patent Application No.7-7605 discloses an illumination system which forms a secondary image via illumination light using an ovoid reflecting mirror to achieve a uniform illuminance distribution.

U.S. Pat. Nos. 4,747,033 and 4,891,739 disclose an illumination unit for a full exposure type copier (i.e., normally for a face-down document type), which does not form a secondary image using a light flux which has been reflected once.

In the construction of the aforesaid illumination systems, a reflecting mirror having an ovoid cross-section must be used to achieve a uniform luminance distribution on the document surface due to the inclination of the document surface relative to the illumination system. When the inclination of the document surface increases, it becomes difficult to maintain the light with a uniform luminance distribution on the document surface. This difficulty can be understood by considering a document illuminated by a linear light source without a reflecting mirror. In a linear light source wherein the light distributed in a direction perpendicular to the length direction (i.e., luminance intensity directional characteristic) has a uniform and infinite length, the luminance at a specific point on the document surface is proportional to the cosine of the entrance angle, and is inversely proportional to the distance from the light source. Thus, a reflecting mirror must be used to produce distributed light so as to reverse and correct this condition (e.g., refer to "Lectures in illumination engineering," (New Edition), S. Seki, Tokyo Electrical Engineering College Press, p71–72 (5.21)). The aforesaid application discloses achieving a uniform luminance distribution by shifting the light source position from the focal point position of the ovoid mirror, but does not describe obtaining uniform luminance by the arrangement of the light source.

The specifications of the aforesaid United States patents disclose the provision of a donut-type light source and a two-dimensional curved reflecting mirror of a rotating body, but since this arrangement does not form a secondary image, the form of the reflecting mirror is increased, and the covering angle of the first reflecting area from the light source is reduced resulting in poor light use efficiency.

SUMMARY OF THE INVENTION

An object of the present invention is to provide an improved illumination system.

Another object of the present invention is to provide an illumination system using a reflecting mirror of a type to form a secondary image of the illumination light, which is capable of increasing the covering angle of the light source on a first reflecting area, and which attains a uniform luminance distribution.

Still another object of the present invention is to provide a two-dimensional area tilted illumination system using a compact reflecting mirror.

Yet another object of the present invention is to provide a two-dimensional area tilted illumination system capable of uniform luminance distribution, which is located at a position opening above the document surface while preventing the light directly reflected from the document from entering the image sensing system, and which efficiently utilizes the light flux emitted by the light source.

These objects are attained by providing a two-dimensional area tilted illumination system comprising a long light source having a longitudinal axis and a reflecting mirror, cylindrical in shape, wherein the reflecting mirror has a generating line parallel to the longitudinal axis of the long light source. The surface of the reflecting mirror has a first area for illuminating an illumination area after the light flux emitted from the long light source is first reflected and converged, wherein the first area is shaped such that the intersection point of the light rays emitted from the light source and reflected at two ends of the first area is a position nearer to the long light source from the light rays emitted from the long light source and reflected from the first area so as to impinge the center of the illumination region.

The invention itself, together with further objects and corresponding advantages will be understood by reference to the following detailed description thereof taken in conjunction with the accompanying drawings.

BRIEF DESCRIPTION OF THE DRAWINGS

FIG. 1b is an enlargement of the cross-sectional view of FIG. 1a;

FIG. 3b is an enlargement of the cross-sectional view of FIG. 3a;

FIG. 5b is an enlargement of the cross-sectional view of FIG. 5a;

FIG. 12b is a side view of the spatial relationship of FIG. 12a.

In the following description, like parts are designated by like reference numbers throughout the several drawings.

DETAILED DESCRIPTION OF THE PREFERRED EMBODIMENTS

The preferred embodiments of the present invention are described hereinafter.

The subject of the embodiments is an tilted illumination system for illuminating a two-dimensional area which is positioned so as to be a distance from a perpendicular line through the center of the illuminated region. The tilted illumination system comprises a long light source and a reflecting mirror having a cylindrical shape which is parallel to the generating line of the long light source.

Figure 8A:
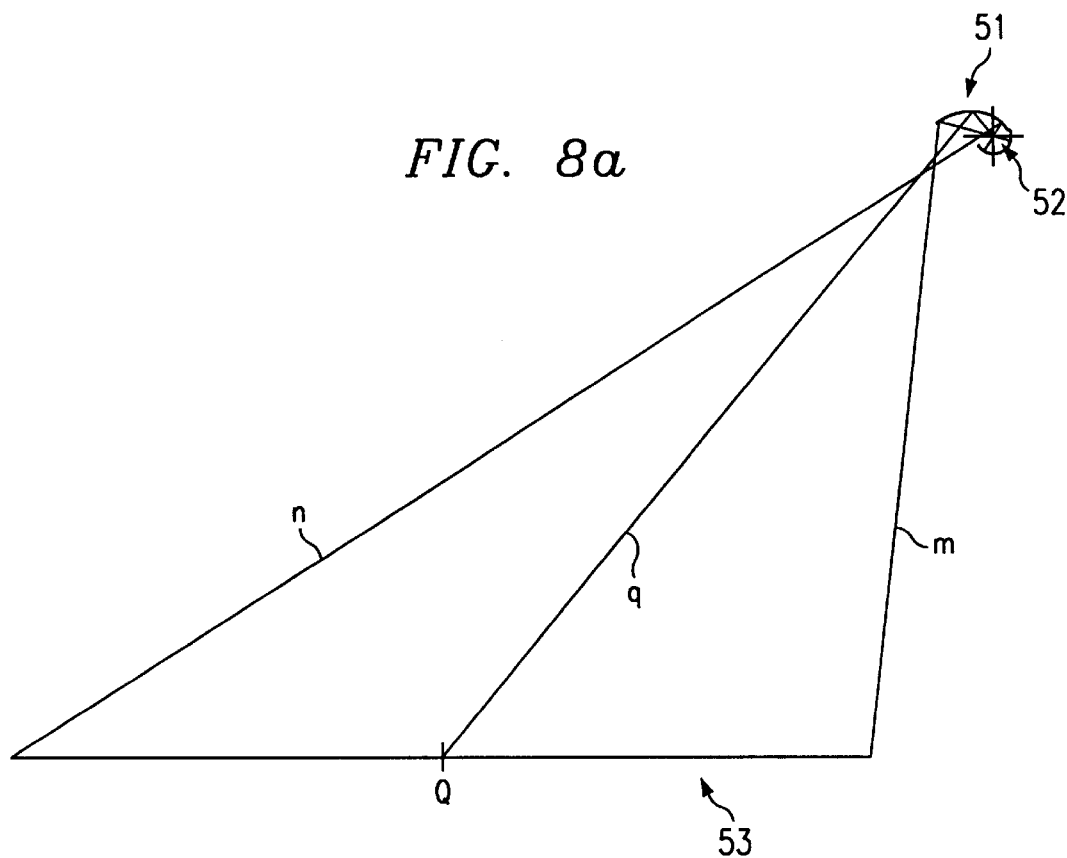
FIGS. 8a and 8b are diagrammatic views of the construction of the illumination system of the present invention.
Figure 8B:
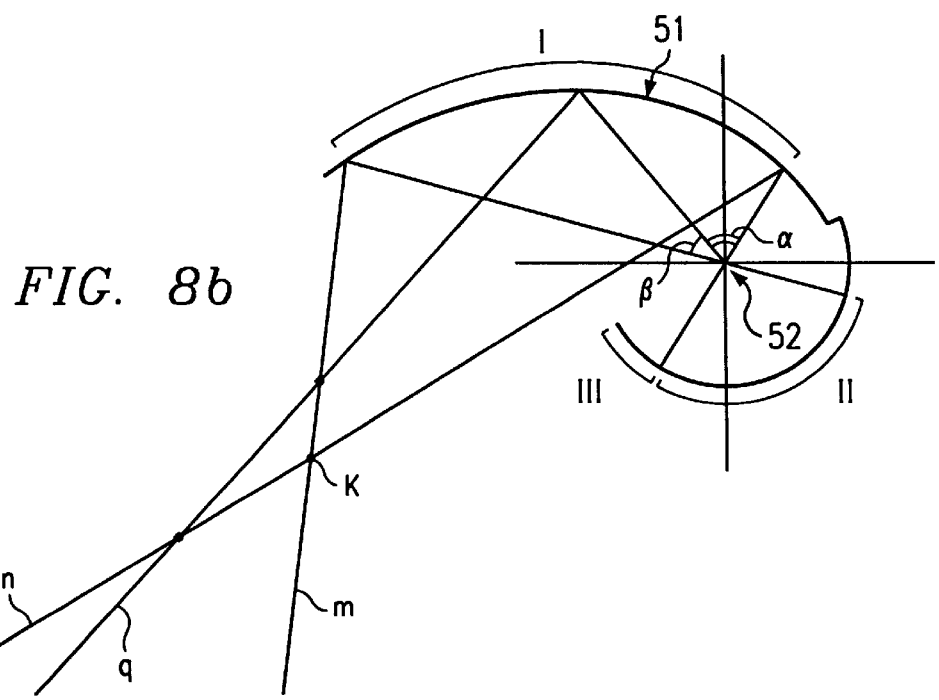
Figure 9A:
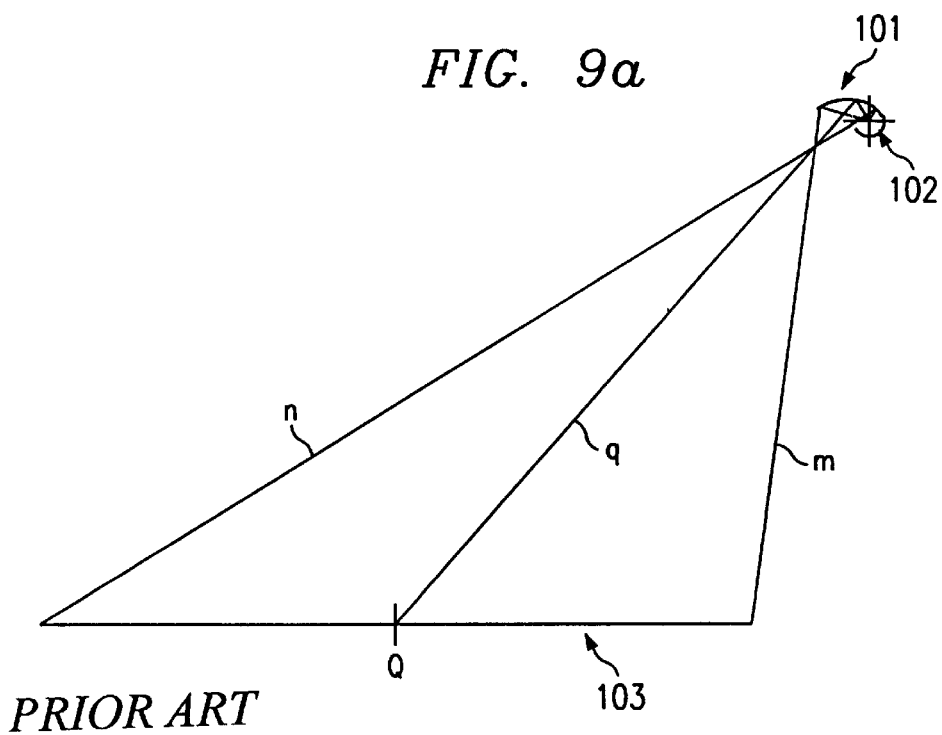
FIGS. 9a and 9b are diagrammatic views of the ovoid mirror of a conventional illumination system.
Figure 9B:
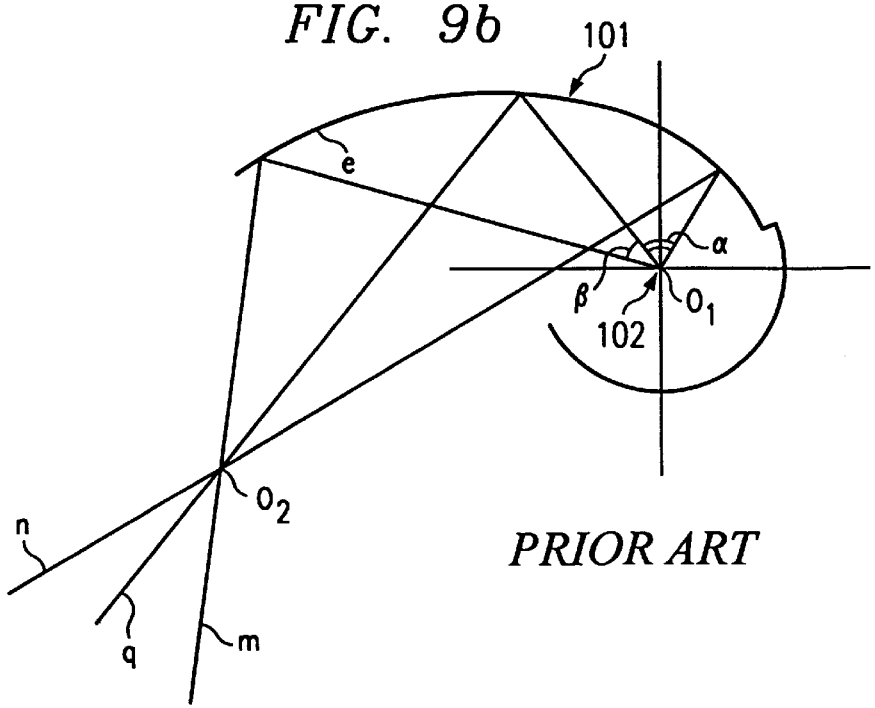

A conventional tilted illumination system is described first with reference to the FIGS. 9a and 9b, wherein a reflecting mirror 101 has an oval region (first area) e which illuminates the illumination surface 103, and a light source 102 at a first focal point $0_1$ of the oval. In the left half of the illumination surface 103 from the center point Q, the distance from the light source 102 is longer and the entrance angle is larger, such that a uniform luminance comprising the majority of the light flux must be attained. Since the light source 102 is disposed at the first focal point of the oval, all the light rays emitted from the light source 102 and reflected by the first area e are condensed at the second focal point $0_2$ of the oval. The light rays m, q, and n are similarly defined as in FIG. 8 as described hereinafter. When a light source providing a uniformly distributed light, i.e., the light has uniform luminance directional characteristics in a plane perpendicular to a longitudinal axis of the light source is used as the light source 102, the light flux impinging the right half of the illumination surface 103 from the center point Q is a light flux of angle β from the light source, and the light flux impinging the left half of the illumination surface 103 from the center point Q is a light flux of angle α from the light source. By arranging the oval such that the relationship β<α a is obtained, setting suitable parameters for the oval, and setting a suitable relationship between the angles α and β, more of the light flux impinges the left half of the illumination surface 103 than impinges the right half of the illumination surface, thereby providing uniform density of the light flux on the illumination surface so as to attain substantially uniform illumination. Although the illumination surface is divided into two portions to simplify understanding, division into small areas must be considered when considering the illumination at various points on the illumination surface.

In this method, since optional light rays emitted from the light source 102 are restricted to passing through the focal point, it becomes difficult to attain suitable distribution of illumination when an oval light source is disposed at the focal point and the degree of inclination of the illumination system increases.

In regard to this issue, the tilted illumination system of the present embodiment provides a reflecting mirror surface which has a first area for illuminating the illumination region after the light flux emitted from a long light source is first reflected and converged, wherein the first area is shaped such that the intersection point of the light rays, emitted from the light source and reflected at two ends of the first area, is a position on the side of the long light source from the light rays emitted from the long light source and reflected from the first area so as to impinge the center of the illumination region.

The operation of the tilted illumination system of the present embodiment is described below with reference to the FIGS. 8a and 8b. In FIGS. 8a and 8b, the reflecting mirror 51 comprises a first area (I) for illuminating the illumination surface 53 after the light flux emitted from a light source 52 comprising a long lamp is first reflected and converged. The reflecting mirror 51 further includes a second area (II) having a circular arc cross-section for reflecting the light flux emitted from the light source 52 back toward the light source 52 and to the first area (I), where the light is reflected and illuminates the illumination surface 53. The reflecting mirror 51 further includes a third area (III) for blocking the light flux emitted from the light source 52 so as to not directly illuminate the illumination surface 53. When the rays m are emitted from the center of the light source 52, they are reflected by the first area (I) so as to impinge the side edge of the illumination surface 53 nearest the reflecting mirror 51. The rays q, emitted from the center of the light source 52, are reflected by the first area (I) so as to strike the center area of the illumination surface. The rays n, emitted from the light source 52 are reflected by the first area (I) so as to impinge the edge of the illumination surface farthest from the reflecting mirror 51. The intersection point of the rays m and the rays n is designated K, and the first area (I) is a shape positioned on the light source 52 side (right side in FIG. 8) when the intersection K borders a straight line including the reflected rays q.

Figure 10:
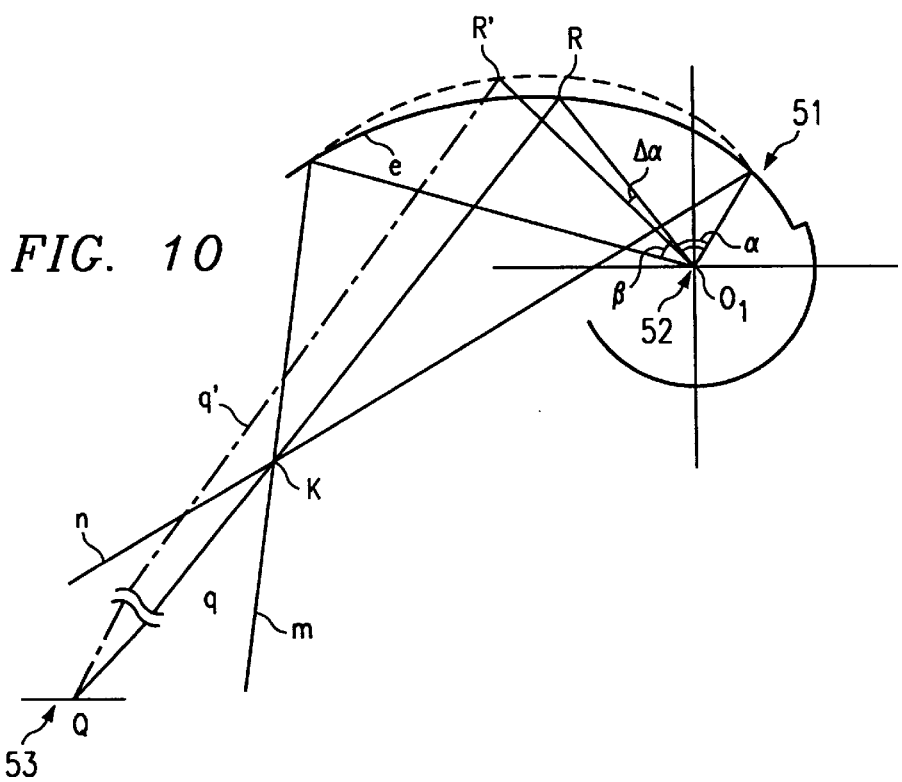
FIG. 10 is a diagrammatic view illustrating the operation of the illumination system of the present invention.

When the degree of inclination of the illumination system relative to the illumination surface increases, the aforesaid illumination system is more advantageous than when the reflecting mirror is a simple ovoid shape disposed at the focal point of the light source, and this situation is described below with reference to FIG. 10. With rays m and rays n being unchanged, the position and angle fixed at the two ends of the first area of the reflecting mirror 51, and the rays q, emitted from position $0_1$ of the light source 52, impinging the center point Q of the illumination surface 53 fixed at two positions $0_1$ and Q, the curve of the first area is freely changed to increase the angle α from the light source 52, thereby moving the reflection point R in the leftward direction (R') as indicated by the broken line. Since the rays q' must pass through the point Q, the intersection point K is located on the right side of the rays q'. The inclination of the tangent of the curve at reflection point R' is above and to the right in the drawing from the inclination at point R. The structure of this curve allows the distribution of the majority of the light flux to an area separated from the light source when the inclination of the illumination system is high, so as to produce a uniform illumination distribution.

Figure 1A:
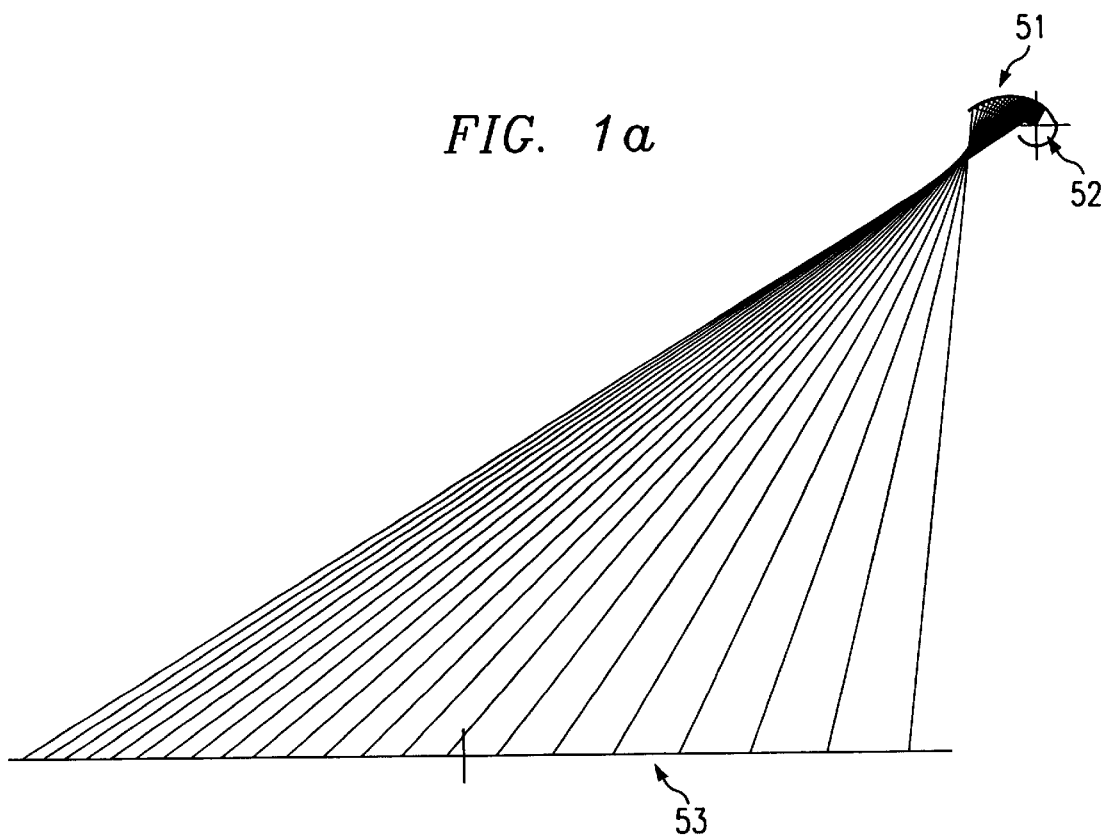
FIG. 1a is a cross-sectional view of the illumination system of a first comparative example.
Figure 1B:
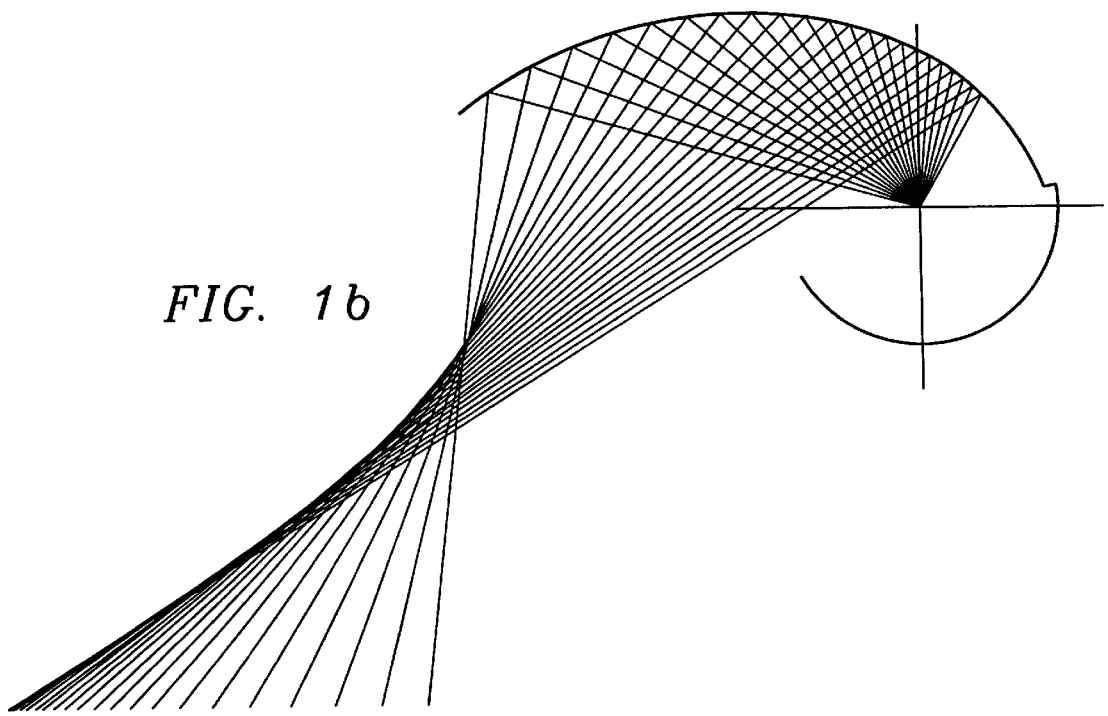
Figure 2:
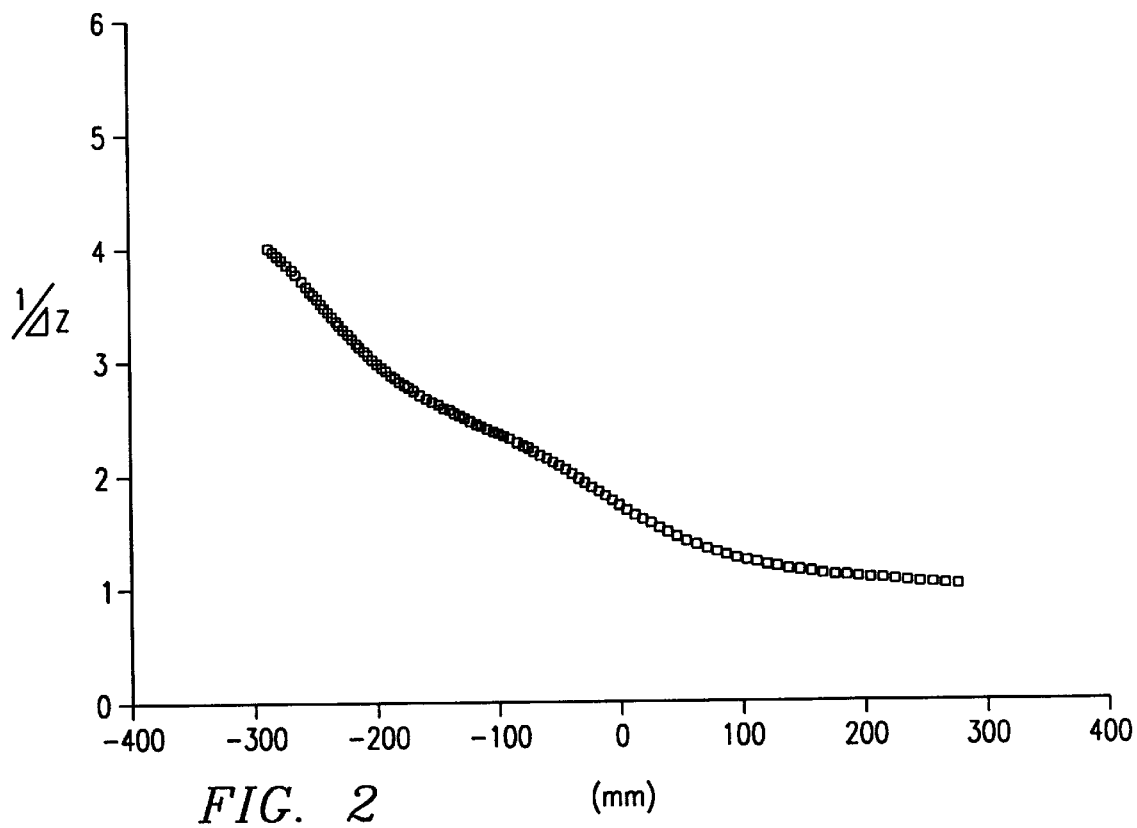
FIG. 2 is a characteristics chart of the first comparative example.
Figure 4:
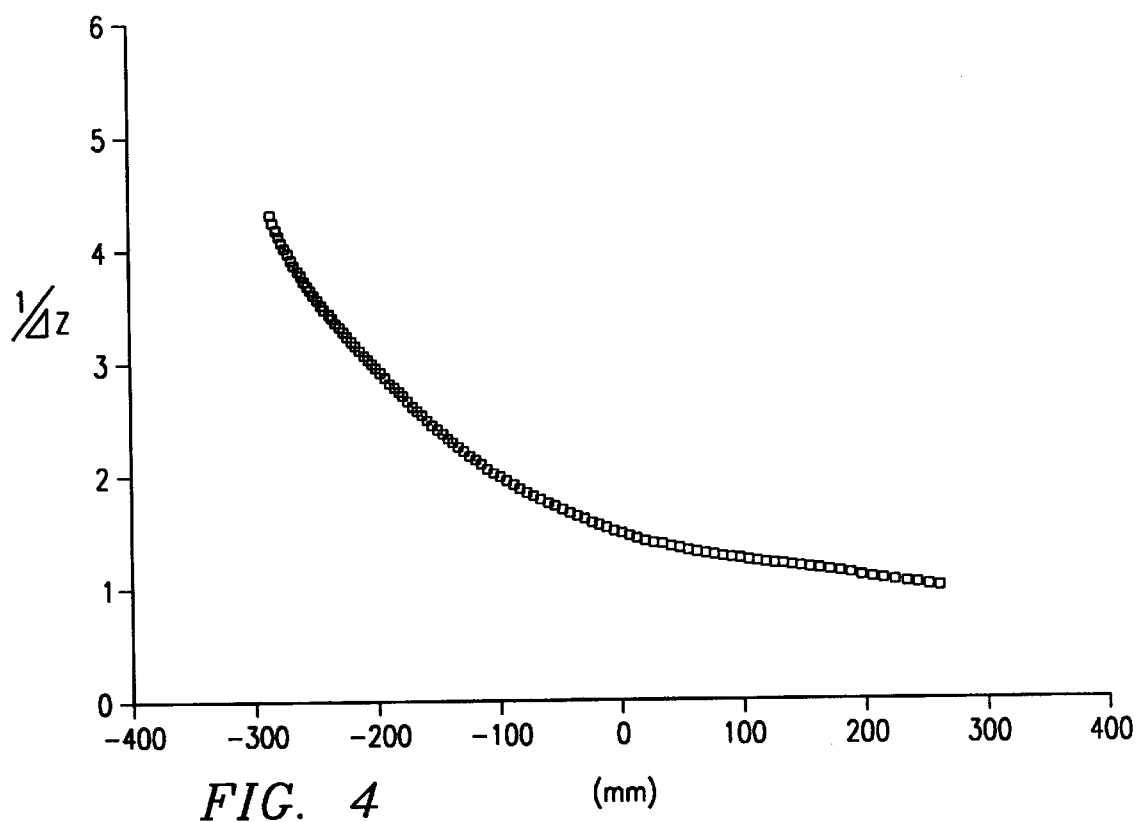
FIG. 4 is a characteristics chart of the second comparative example.
Figure 3A:
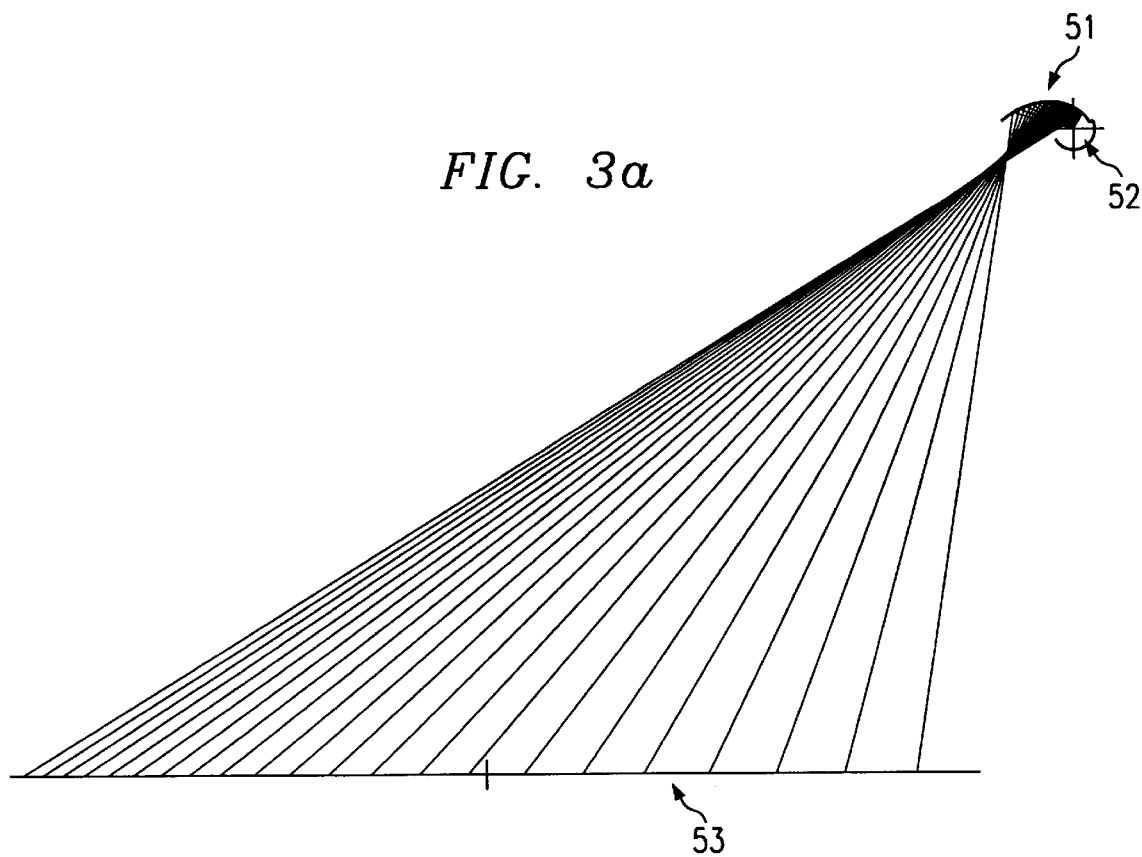
FIG. 3a is a cross-sectional view of the illumination system of a second comparative example.
Figure 3B:
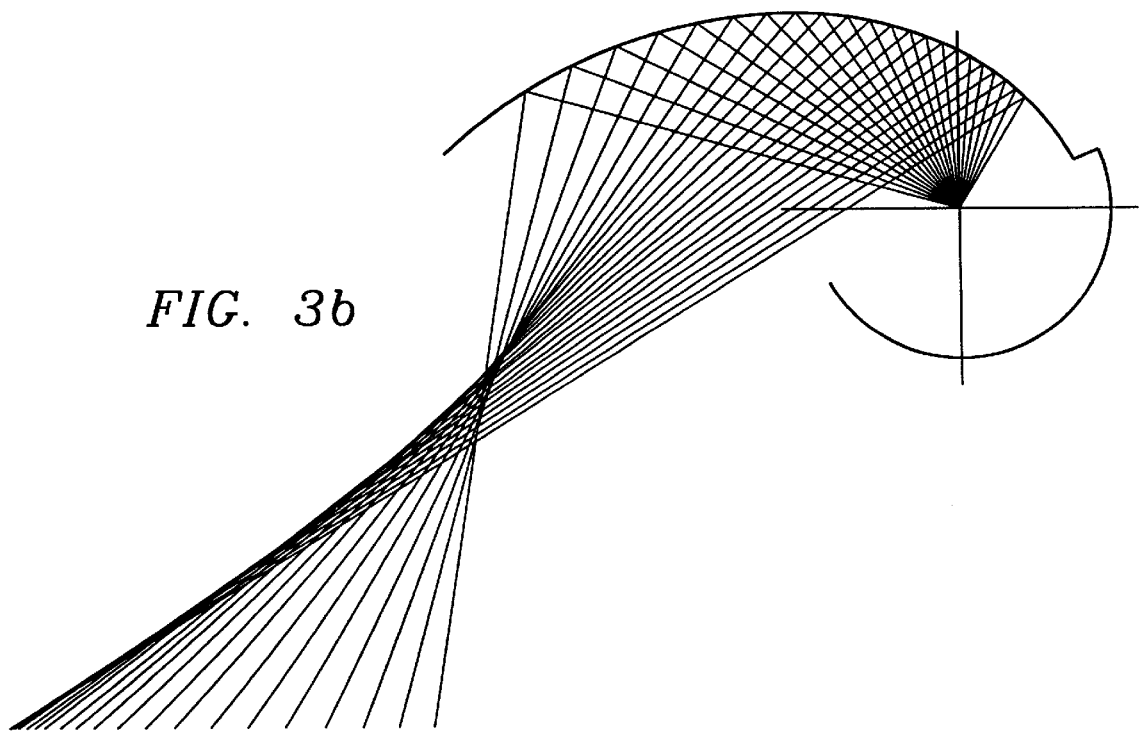
Figure 5A:
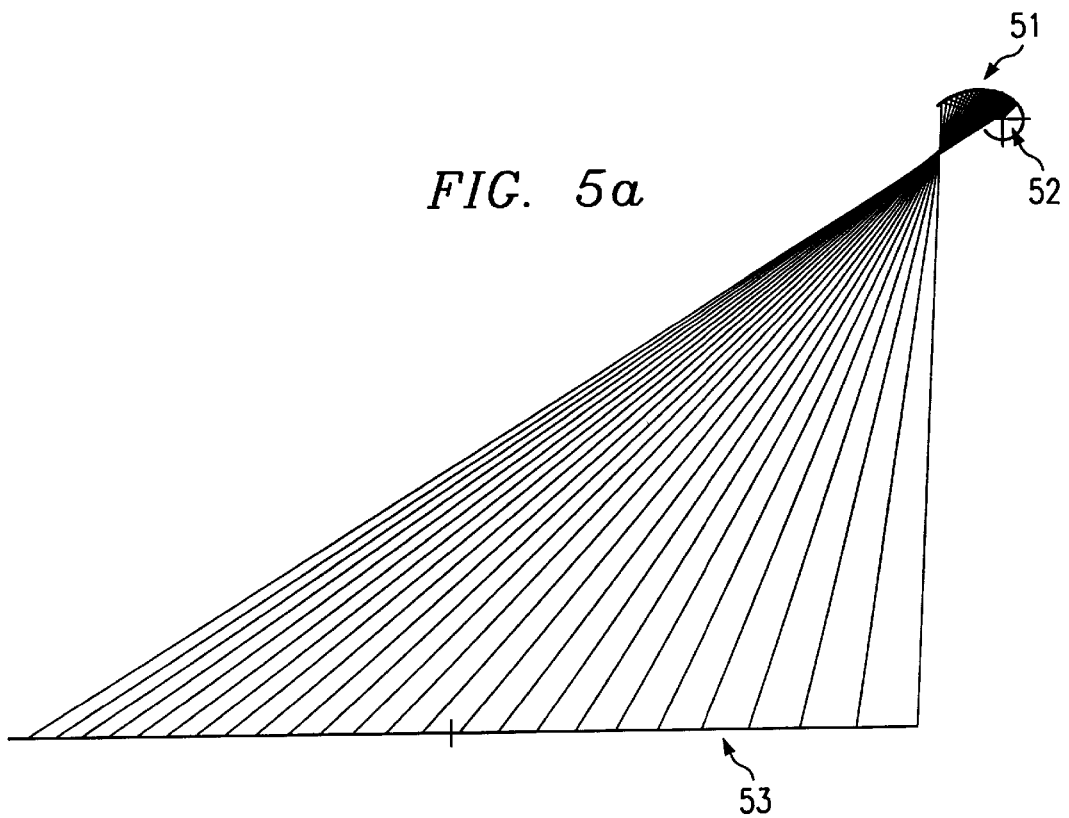
FIG. 5a is a cross-sectional view of the illumination system of a third comparative example.
Figure 5B:
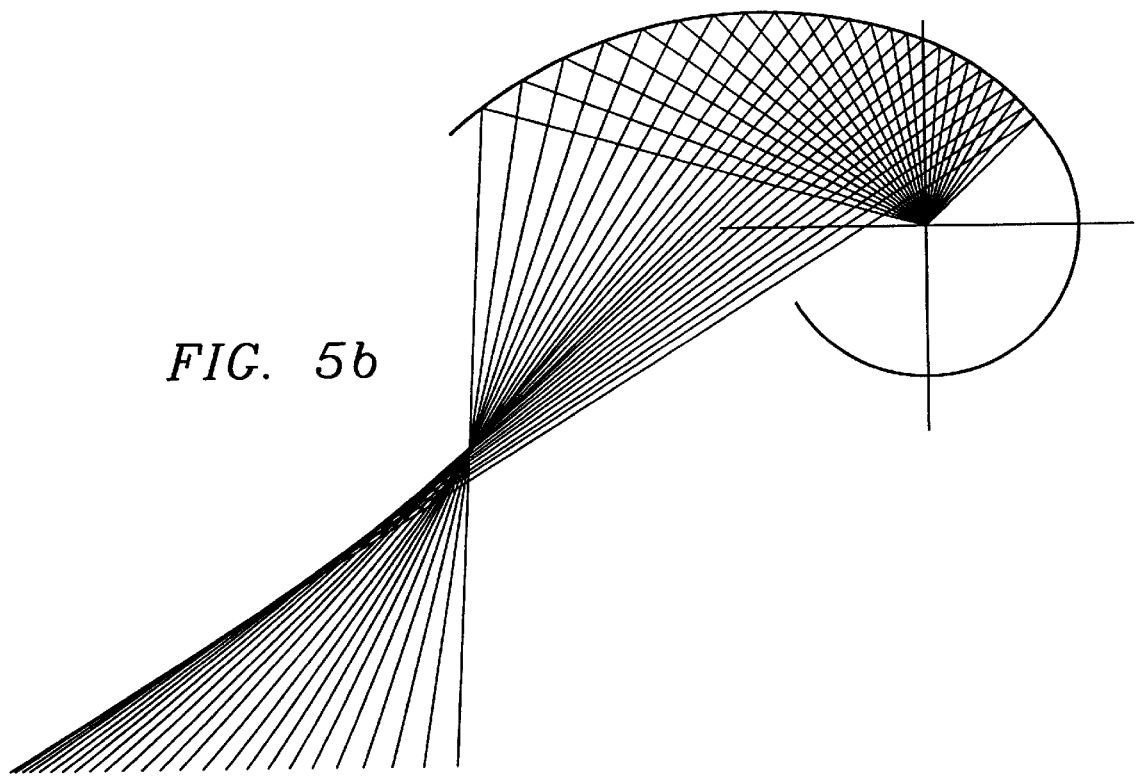
Figure 6:
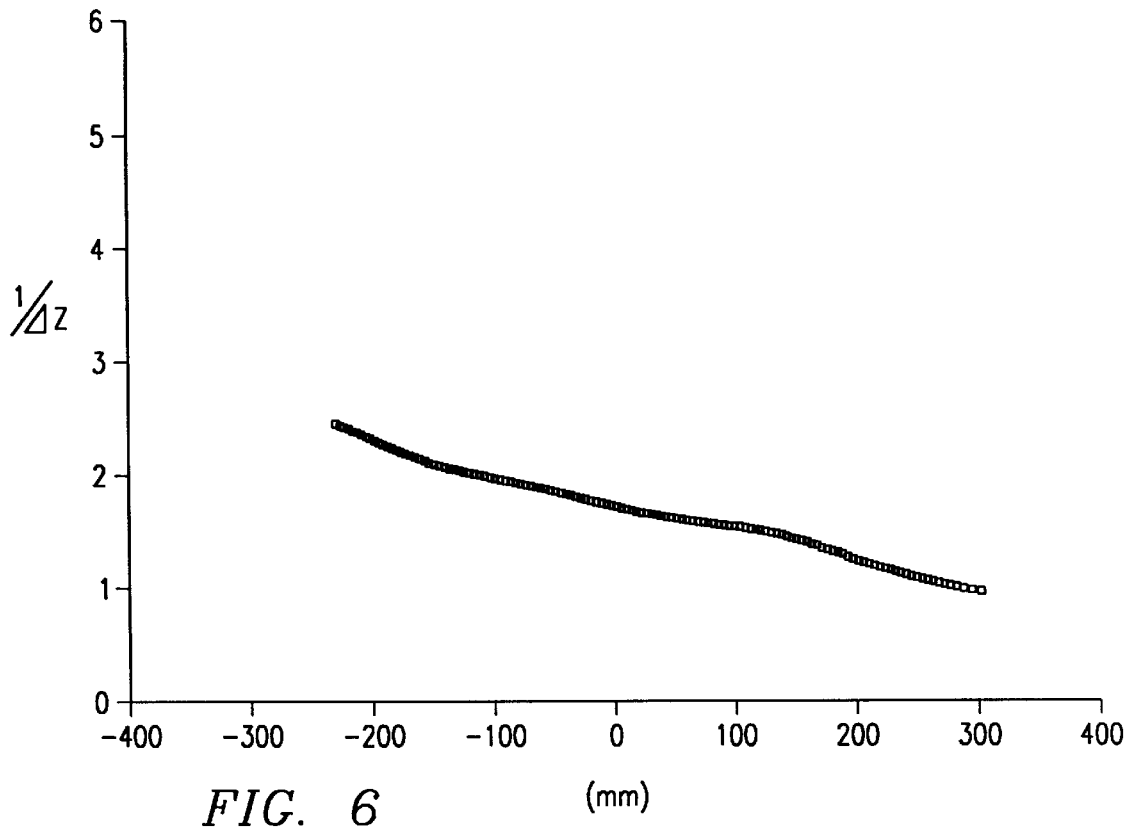
FIG. 6 is a characteristics chart of the third comparative example.

The first, second, and third comparative examples of the illumination system of the present embodiment are shown in FIGS. 1a and 1b, FIGS. 3a and 3b, and FIGS. 5a and 5b, respectively. FIGS. 1b, 3b, and 5b are enlarged views of portions of FIGS. 1a, 3a, and 5a, respectively. FIGS. 2, 4, and 6 are graphs of 1/ΔZ relative to the lateral positions on the illumination surface of the first, second, and third comparative examples. The term 1/ΔZ is a reciprocal of the width on the illumination surface of two rays emitted from the center of the light source at small constant angles and is equivalent to the density of the light flux at the illumination surface. The horizontal axis shows the coordinates of the illumination surface, wherein the point Q is the origin, and the negative direction is a direction away from the reflecting system. Specific numbers specifying the construction of the illumination system are discussed hereinafter. In the illumination system, when the angle or covering angle φ in a plane perpendicular to the generator line of the reflecting mirror 51, the first area (I) of the reflecting mirror 51 of the first comparative example and the second comparative example satisfy φ=105°, and the first area (I) of the reflecting mirror 51 from the center of the light source 52 in the third comparative example satisfies the condition φ=120 °.

When considering the reflectivity of the reflecting mirror 51, the light reflected from the first area (I) increases illuminance on the illumination surface 53 even though the angle is the same. The second area is circular with a center at the center of the light source, and since the angle from the light source to the second area is equal to the angle from the light source to the first area, the luminance distribution is adequate when considering only the first reflected light. In the several comparative examples, the light source 52 is assumed to have coil-like filaments extending along a common longitudinal axis. The axis of symmetry of the coil-like filaments is a direction perpendicular to the drawing surface (X axis).

Figure 7A:
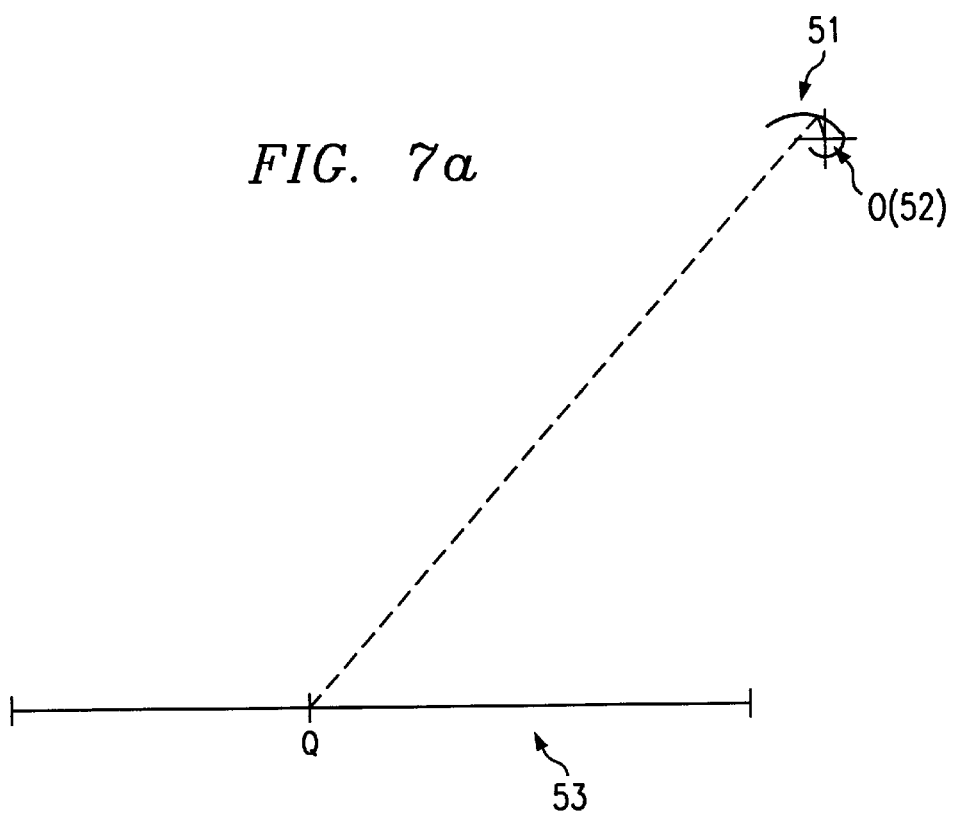
FIGS. 7a and 7b are diagrammatic views which illustrate the illumination system of the present invention.
Figure 7B:
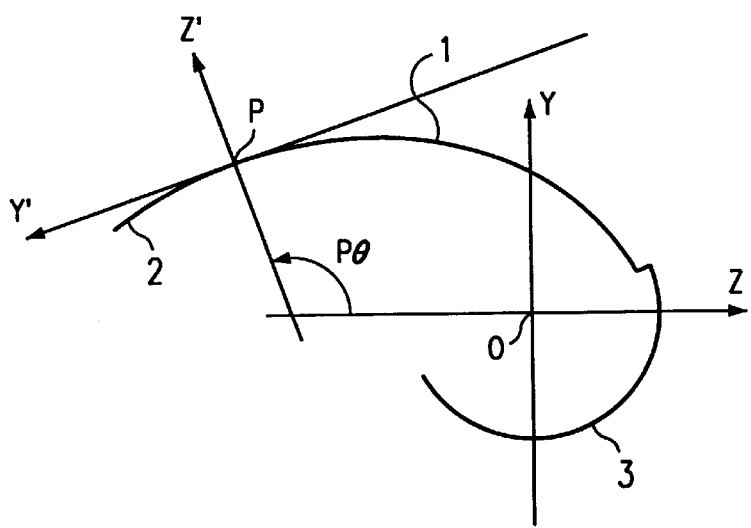

Referring now to FIGS. 7a and 7b, the shape of the mirror surface of the reflective mirror 51 is defined. The reflecting mirror 51 is cylindrical in shape with the X axis direction designated the generating line, and the cross-sectional shape is shown with the cross-section in the ZY plane. The coordinate system is an orthogonal coordinate system that specifies the light source position 0 as the origin, the rightward direction in the drawing as the positive direction on the Z axis, the upward direction as the positive direction on the Y axis, and the direction perpendicular to the drawing surface as the X axis. In the drawing, the ZY plane is shown. The coordinates of points within the ZY plane are expressed as (Z,Y). Symbols of rotation within the ZY plane indicate that counterclockwise rotation is positive in the drawings. P represents the apex position of the surface common to curve 1 and curve 2. Pθ represents the angle of rotation of the coordinate system at the apex of the surface common to curve 1 and curve 2. Each curve has a local coordinate system having the surface apex as the origin, and touching the curve at the origin. When considering a coordinate system wherein the Z axis is designated as the axis of symmetry and the Y axis is designated the axis touching the curve, the amount of sag from the Y axis is defined by the following equation.

$$Z=(CURV)Y/[1+\sqrt{1-(1+k)(CURV)^2Y^2}]+(A)Y^4+(B)Y^6+(C)Y^8+(D)Y^{10}$$

The first term on the right side represents the secondary curve, and the second and subsequent terms on the right side represent high order additive terms. CURV represents the curvature at the surface apex, and K represents a conical constant. A, B, C, and D are coefficients of the additive terms. When the high order additive terms of the above equation are not present, i.e., when A, B, C, and D=0, the curvature is circular when K=0, and the curvature is conical having a short diameter on the Z axis direction when k>0. The values Ymin and Ymax described hereinafter are represented inn the local coordinate system, and are the ranges defining the curve.

The illumination surface 53 (the document surface) is within the plane perpendicular to the Y axis, Q is a reference position at the center of the illumination surface, and the effective area of the illumination surface is Zmin≦Z≦Zmax within the ZY plane. In each of the first through third comparative examples, the effective area of the illumination surface and the coordinate of point Q are identical: Q=(−380.5, −411.2), Zmin=−672.5, Zmax=−65.5. As shown in FIGS. 2, 4, and 6, the value 1/ΔZ increases on the left side from the center position (0 mm) on the illumination surface, i.e., the value is greater on the side away from the light source than on the side near the light source. In this way, uniform illumination is possible even though there is diffusion on the reflecting surface by the long light source which has a finite length. In FIGS. 2 and 4, the value of 1/ΔZ is such that the median value is smaller than the average value at the two edges at the center or the two edges of the illumination surface, i.e., has a downward convex shape. Since the diffusion light is cut at the two edges, it is possible to attain uniform illumination. The first area on the reflecting mirror 51, when viewed from a direction horizontal to the illumination surface 53 (lateral direction in the drawing), extends across the center position of the light source 52. In this way, the covering angle of the first reflected light of the light source is increased so as to allow the light flux to be used effectively.

Only the data of curve 1 and curve 2 of the various comparative examples are shown in the tables below. Curve 3 is circular about the center of the center position of the light source 51, and the mirror of curve 3 returns the rays emitted from the center of the light source back to the light source, such that the direction of advancement is reflected. That is, the curve 3 effectively uses the light flux emitted from the light source. The effective area of the curve is determined so that light flux emitted from the light source does not directly enter the illumination surface (document surface), i.e., so as to prevent the light flux emitted from the light source and reflected by the mirrors of curve 1 and curve 2 from entering the illumination surface. The radius of the curve 3 may be any size insofar as these two conditions are satisfied.

In FIGS. 1, 3, and 5, the intersection areas of curve 3 and curve 1 are at different levels, but this difference in level is eliminated if the radius of curve 3 is suitably set. When a difference in level occurs, the location of the difference in level may be anywhere insofar as the light flux reflected by the mirror of curve 1 is prevented from entering the illumination surface, and the light flux reflected by the mirror of curve 3 is again reflected by the mirror of curve 1 or curve 2 and prevented from entering the illumination surface. Ymin of curve 1, shown in the data below, only represents the range defining curve 1, and does not necessarily represent the location of the difference in level of the border of curve 3. Conversely, the Ymax of curve 2 represents the effective area. In the discussion above, the light flux emitted from the light source is assumed to be a light source having magnitude.

TABLE 1

(First comparative example)

| | |
|---|---|
| P = (−29.23, 16.80) | Pθ = 106.89° |
| Curve 1 | |
| CURV: −0.022128 | K:0.668800 |
| A: 0.105533E−05 | B:−0830175E−09 |

TABLE 1-continued (First comparative example)

| | |
|---|---|
| C:0.299281E-12 | D:−0.285837E-16 |
| Ymin:−34.98 | Ymax:0.0 |
| Curve 2 | |
| CURV:−0.022222 | |
| Ymin:0.0 | Ymax:16.0 |

TABLE 2

(Second comparative example)

| | |
|---|---|
| Curve 1 | |
| CURV: −0.022135 | K:0.668800 |
| A:−0.209856E-06 | B:0.713242E-09 |
| C:−0.464299E-12 | D:0.179142E-15 |
| Ymin:−34.97 | Ymax:0.0 |
| Curve 2 | |
| CURV:−0.022135 | |
| Ymin:0.0 | Ymax:16.0 |

TABLE 3

(Third comparative example)

| | |
|---|---|
| Covering angle φ = 120° | |
| P = (−33.09, 14.92) | Pθ = 115.78° |
| Curve 1 | |
| CURV:−0.021251 | K:0.668800 |
| A:0.275188E-06 | B:−0.874450E-09 |
| C:0.847684E-12 | D:−0.310017E-15 |
| Ymin:−36.43 | Ymax:0.0 |
| Curve 2 | |
| CURV:−0.021251 | |
| Ymin:0.0 | Ymax:12.0 |

Figure 11:
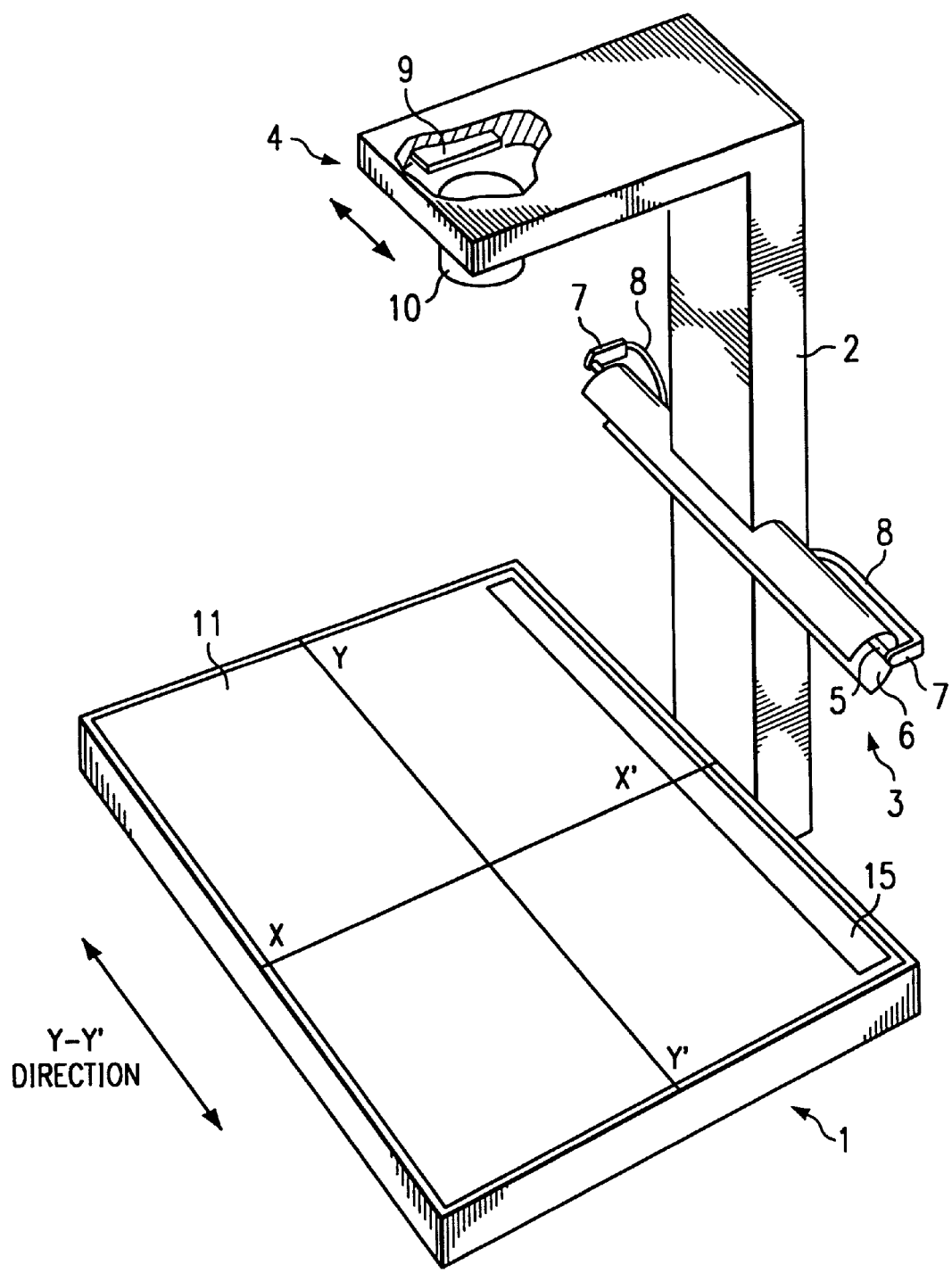
FIG. 11 is a perspective view of an image reader using the illumination system of the present invention.
Figure 12A:
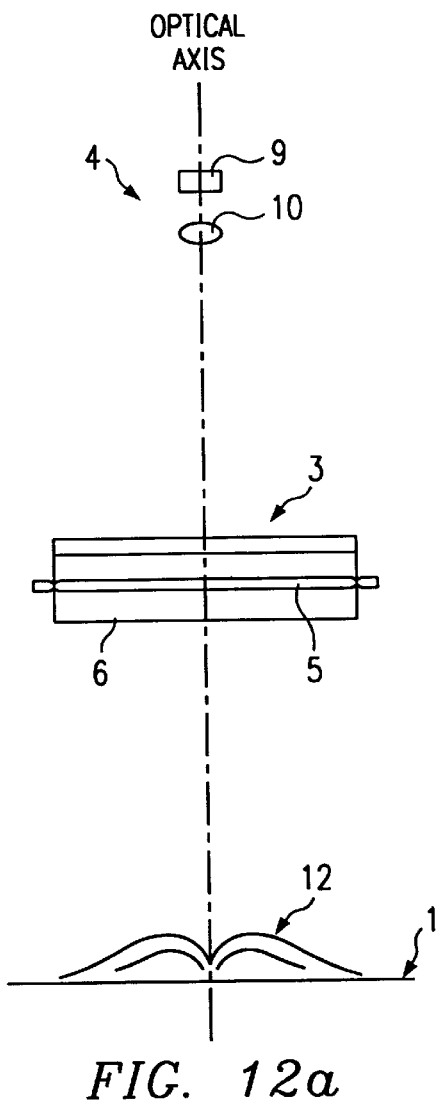
FIG. 12a is a front view showing the spatial relationship between the image sensing device, the document table of the image reader, and the illumination device.
Figure 12B:
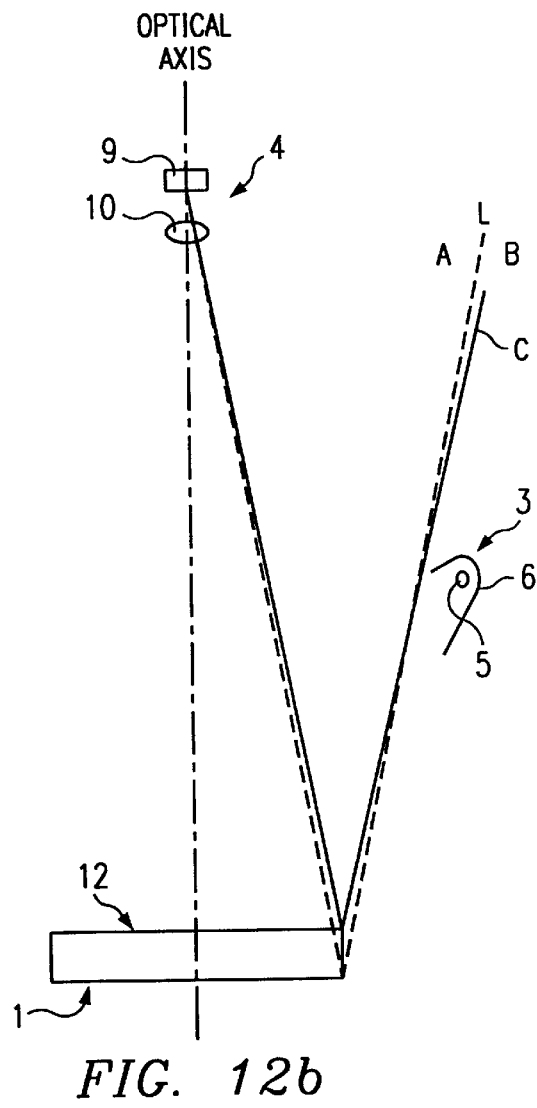

FIGS. 11, 12a, and 12b show examples of the illumination system of the present embodiments applied to an image reader. In FIG. 11, the image reader is provided with a document table 1 for placing a document, an illumination device 3 (illumination system) provided at a predetermined height on a support column 2 disposed at a position at the rear of the document table 1, and an image sensing device 4 supported on the support column 2 at a position above the approximate center of the document table 1. A reference reflecting panel 15 is provided on the back side of the document table 1 in the Y–Y' direction for correcting the sensitivity of the image sensing device 4. The illumination device 3 is provided with a linear light source 5 extending in the Y–Y' direction in the drawing, a reflecting mirror 6 for reflecting the light emitted from the light source 5 toward the document table 1, electrodes 7, and leads 8. The image sensing device 4 comprises a reading sensor 9, such as an image sensor, for scanning in the direction indicated by the arrow in the figure to sense the reflected light from the document surface, and an image forming lens 10 for forming an image on the reading sensor 9.

In the image reader of the aforesaid construction, part of the illumination light emitted from the light source 5 indirectly illuminates the document surface 11 via the direct reflecting mirror 6. This light is reflected and diffused on the document surface 11, and the reflected light is read by the reading sensor 9 which performs an optical scanning operation via the optical image forming lens 10 as image information such as variable density or color of the document surface.

FIGS. 12a and 12b are front and side views illustrating the positional relationships of the image sensing device 4, the illumination device 3, and the document table 1 in the image reader. When direct reflected light from the document surface enters the image sensing device 4, part of the luminance is greater than the luminance that can be read properly by the reading sensor 9, such that accurate image information, such as variable density, color and the like, cannot be obtained, and image quality is reduced. In order to eliminate this disadvantage, the illumination device 4 is disposed outside the limit range (indicated by the phantom line C), from which reflected light originates, when illuminating a document 12 which is thick, such as a book. The illuminating device 4 is located in the area B (in rear of the document table 1), which is bordered by the dotted line L. This arrangement prevents direct reflected light from entering the image sensing device 4.

A single illumination device 3, which uses a linear light source 5 capable of uniformly illuminating the entirety of the document surface 11, and is arranged on the support column 2 both to reduce cost and allow easy document placement. The illumination device 3 is not located in the space between the document table 1 and the image forming lens 10. Since the illumination device 3 is disposed behind the document table 1, there is reduced influence of direct reflected light from the curved surface of the open-faced book 12.

The present invention is not limited to the aforesaid comparative examples, and may be variously modified. For example, although it is advantageous from the perspective of precision to integratedly form the first through third areas of the reflecting mirror, these areas also may be formed separately and assembled on the main mirror.

The functions of the construction of the embodiments are described below.

When viewing a cross-sectional plane which is perpendicular to the generating line of the reflecting mirror, the illumination surface is tilted with respect to the mirror, and uniform luminance distribution can be realized by forming the reflecting mirror so that the intersection point of light rays passing through two ends of a first area of the reflecting mirror is on the side nearer to the light source than the light rays impinging the center of the illumination surface.

When the first area of the reflecting mirror is formed with a curve having symmetry such as an oval, and the angle φ within the cross-section of the first area of the reflecting mirror is greater than 90° from the center of the light source, the inclination and curvature of this symmetry cannot be suitably controlled, therefore making it difficult to attain uniform illumination. Joining a plurality of curves in the first area, however, improves the freedom of design and allows suitable control of the curvature and inclination so as to readily provide uniform illumination.

When the first area of the reflecting mirror is formed with a curve having only two parameters, as in a secondary curve such as an oval, and the angle φ within the cross-section of the first area of the reflecting mirror is greater than 90° from the center of the light source, the inclination and curvature and reflecting point cannot be suitably controlled at optional points on the curve, therefore making it difficult to attain uniform illumination. The present invention eliminates these disadvantages, however, by using a curve of a higher degree of freedom than a secondary curve in the first area.

When the light flux impinging the third area, which blocks the light flux emitted from the light source so as to prevent the flux from directly illuminating the illumination surface, is directed to the first area, this light flux illuminates the majority of the area of the illumination surface near the illumination system, therefore making it difficult to attain uniform illumination. The present invention eliminates this disadvantage, however, by not directing the light flux of the third area to the first area.

Since most of the light emitted from the long light source is at the two ends in the lengthwise direction, a uniform luminance distribution is attained in the lengthwise direction of the light source on the illumination surface exposed by the light flux from the light source. This light source can be attained by providing a plurality of coil-like filaments, for example, such that the length of the coil in the lengthwise direction of the edges is longer than the length of the coil in the center.

Since the light flux emitted from the light source is reflected toward the light source, and the covering angle of the second area, which has a circular arc cross-section perpendicular to the longitudinal axis of the light source to illuminate the illumination surface via the first area, is identical to the covering angle of the first area, the luminance distribution is completely identical to the luminance distribution of the first area, thereby increasing the total amount of light.

In setting the parameters of the luminance distribution, the value of $1/\Delta Z$, which is equivalent to the density of the light flux on the illumination surface, is set so as to be greater at the edge away from the illumination surface. This value expresses the luminance at each point when the light source is a linear light source having infinite length (i.e., the light source is uniform in cross-section regardless of the direction away from the center of the light source) and there is absolutely no diffusion by the reflecting surface. Although the percentage of direct reflected light changes in accordance with the entrance angle, there is no diffusion in the case of a reflecting mirror. Since this ratio is dependent on location and expresses the luminance ratio, it is effective in obtaining uniform illumination as described above when considering the actual light source length, arrangement, and diffusion by the mirror surface.

In setting the parameters of luminance distribution, the value $1/\Delta Z$ is set to be smaller at the center than at the two edges of the illumination surface. When considering the effects of diffusion, since the diffused light is cut on one side at the two edges but in the center diffused light remains on both sides, a uniform illumination is attained as described above.

The light flux emitted from the light source is used effectively by means of a construction which increases the covering angle of the light source at the area of the first reflection.

Although the present invention has been described with referenced to presently preferred embodiments, it will be appreciated by those skilled in the art that various modifications, alternatives, variations, etc., may be made without departing from the spirit and scope of the invention as defined in the appended claims.

What is claimed is:

1. A two-dimensional area tilted illumination system comprising:
   a long light source for emitting a light flux comprising light rays, the long light source having a longitudinal axis; and
   a reflecting mirror, said reflecting mirror having a curved surface defined by a generating line which is parallel to the longitudinal axis of the long light source,
   wherein the curved surface of the reflecting mirror has a first area for illuminating an illumination surface after the light flux is first reflected and converged, and
   wherein the first area is shaped such that an intersection point of the light rays, reflected at two ends of the first area, is a position which is located in a plane which is perpendicular to said generating line and which contains a light ray impinging a center of the illumination surface, with said position being on the same side as the long light source with respect to said light ray impinging the center of the illumination surface.

2. A two-dimensional area tilted illumination system in accordance with claim 1, wherein the first area comprises multiple curves, in a cross-section perpendicular to the generating line of the reflecting mirror, adjacent ones of said multiple curves being tangentially continuous.

3. A two-dimensional area tilted illumination system in accordance with claim 2, wherein the multiple curves, in a cross-section perpendicular to the generating line of the reflecting mirror, are defined by three or more parameters.

4. A two-dimensional area tilted illumination system in accordance with claim 1, wherein the reflecting mirror has a second area which is a circular arc in a cross-section perpendicular to the generating line of the reflection mirror which reflects the light flux received directly from the long light source back toward the light source and illuminates an illumination surface with light flux reflected from the first area, said reflecting mirror having a third area for blocking a portion of the light flux emitted from the long light source so as to prevent any light flux from passing directly from the light source to the illumination surface, and
   wherein the third area does not direct the light flux, emitted from the light source and impinging the third area, toward the first area.

5. A two-dimensional area tilted illumination system in accordance with claim 1, wherein a luminance, generated by the light rays, in a direction perpendicular to the lengthwise direction of the long light source is uniform regardless of direction away from said long light source, and wherein a level of said luminance is higher at the edges of said long light source than at a center, in a lengthwise direction, of said light source.

6. A two-dimensional area tilted illumination system in accordance with claim 1, wherein the long light source is a lamp having a plurality of coil-like filaments extended along a common axis.

7. A two-dimensional area tilted illumination system in accordance with claim 1, wherein said first area has a covering angle which is equal to an angle between two ends of the first area as measured from the longitudinal axis of the long light source, and said second area has a covering angle which is equal to an angle between two ends of the second area as measured from the longitudinal axis of the long light source; and
   wherein the covering angle of the second area is equal to the covering angle of the first area in a cross-section perpendicular to the generating line of the reflecting mirror.

8. A two-dimensional area tilted illumination system in accordance with claim 1,
   wherein said illumination surface has edges, a first edge being farthest from the light source, and a second edge being nearest to the light source, and a center being mid point between these two edges;
   wherein the light rays emitted from the longitudinal axis of the light source and reflected by the first area of the reflecting mirror so as to impinge the illumination surface have a light density value $1/\Delta Z$ in a cross-section perpendicular to the generating line of the reflecting mirror; and wherein when $1/\Delta Z$ is measured by comparing sets of two rays, each ray of a set being emitted from the longitudinal axis of the light source at a same small constant angle relative to the other ray of the respective set;

the value $1/\Delta Z$ is greater at the first edge than at the second edge of said illumination surface.

9. A two-dimensional area tilted illumination system in accordance with claim 1;

wherein said illumination surface has edges, a first edge being farthest from the light source, and a second edge being nearest to the light source, and a center being mid point between these two edges;

wherein the light rays emitted from the longitudinal axis of the light source and reflected by the first area of the reflecting mirror so as to impinge the illumination surface have a light density value $1/\Delta Z$ in a cross-section perpendicular to the generating line of the reflecting mirror; and wherein when $1/\Delta Z$ is measured by comparing sets of two rays, each ray of a set being emitted from the longitudinal axis of the light source at a same small constant angle relative to the other ray of the respective set;

the value $1/\Delta Z$ is smaller in the center than the average of the value $1/\Delta Z$ at the first edge and the value $1/\Delta Z$ at the second edge of said illumination surface.

10. A two-dimensional area tilted illumination system in accordance with claim 1, wherein the first area of the reflecting mirror extends across a center position of the light source in a cross-section perpendicular to the generating line of the reflecting mirror, said cross-section also being perpendicular to the illumination surface.

* * * * *

UNITED STATES PATENT AND TRADEMARK OFFICE
CERTIFICATE OF CORRECTION

PATENT NO. : 6,238,066 B1
DATED : May 29, 2001
INVENTOR(S) : Satoshi Iwasaki

It is certified that error appears in the above-identified patent and that said Letters Patent is hereby corrected as shown below:

Column 10,
Line 23, after "with", insert -- the --.
Line 67, after "mirror;", delete "and".

Column 11,
Lines 4 and 5, after "set;", insert -- and wherein --.

Column 12,
Line 2, after "mirror;", delete "and".
Lines 6 and 7, after "set;", insert -- and wherein --.

Signed and Sealed this

Twenty-sixth Day of February, 2002

Attest:

JAMES E. ROGAN
*Attesting Officer*    *Director of the United States Patent and Trademark Office*